US008810217B2

(12) United States Patent
Malmberg et al.

(10) Patent No.: US 8,810,217 B2
(45) Date of Patent: Aug. 19, 2014

(54) CURRENT SHARE CONFIGURATION IN A POWER CONVERTER SYSTEM

(75) Inventors: Jonas Malmberg, Färjestaden (SE); Mikael Håkan Appelberg, Göteborg (SE); Anders Kullman, Kalmar (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 277 days.

(21) Appl. No.: 13/262,488

(22) PCT Filed: Dec. 21, 2009

(86) PCT No.: PCT/EP2009/067635
§ 371 (c)(1),
(2), (4) Date: Dec. 8, 2011

(87) PCT Pub. No.: WO2010/112094
PCT Pub. Date: Oct. 7, 2010

(65) Prior Publication Data
US 2012/0169311 A1 Jul. 5, 2012

Related U.S. Application Data

(60) Provisional application No. 61/165,814, filed on Apr. 1, 2009.

(51) Int. Cl.
*G05F 1/46* (2006.01)
*H02M 3/157* (2006.01)
(52) U.S. Cl.
USPC ........................................ 323/272

(58) Field of Classification Search
CPC .............................. H02M 3/157; H02M 3/1584
USPC .......... 323/272, 234, 283; 363/72, 65, 67, 69; 307/82; 327/294
See application file for complete search history.

(56) References Cited

U.S. PATENT DOCUMENTS 5,157,269 A * 10/1992 Jordan et al. ................... 363/72
5,847,950 A 12/1998 Bhagwat
6,236,582 B1 * 5/2001 Jalaleddine ................... 363/72

(Continued)

OTHER PUBLICATIONS

"Digital DC-DC Controller with Drivers and Pin-Strap Current Sharing," Intersil Americas Inc., Feb. 19, 2009.*

(Continued)

*Primary Examiner* — Adolf Berhane
*Assistant Examiner* — Jye-June Lee
(74) *Attorney, Agent, or Firm* — Coats & Bennett, P.L.L.C.

(57) ABSTRACT

A power converter system disclosed herein includes first and second voltage converting modules, for converting input current to output voltage, and a current share controller configured to establish a master-slave relationship between the first and second voltage converting modules. As a result, one of the first and second voltage converting modules acts as a master module, and the other acts as a slave module. The first and second voltage converting modules are arranged to operate in a current share configuration so as to share a load of the power converter system. The master module determines its output current and sends a signal indicative of its output current to the slave module via at least one signaling line connecting the master and modules to the current share controller. The slave module adjusts its output current in dependence on the signal from the master module.

12 Claims, 6 Drawing Sheets

(56) References Cited

U.S. PATENT DOCUMENTS

| | | | |
|---|---|---|---|
| 6,788,036 B1 | 9/2004 | Milavec et al. | |
| 7,629,823 B2 * | 12/2009 | Wang | 327/172 |
| 7,888,918 B2 * | 2/2011 | Wu et al. | 323/224 |
| 2004/0246754 A1 | 12/2004 | Chapuis | |

OTHER PUBLICATIONS

"Introduction to the PMBus," Robert V. White et al., System Management Interface Forum, May 2005.*

Huth, S. "DC/DC Converters in Parallel Operation with Digital Load Distribution Control." Proceedings of the IEEE Symposium on Industrial Electronics, 1996 (ISIE '96), Warsaw, Poland, Jun. 17-20, 1996.

Huth, S., "DC/DC-Converters in Parallel Operation with Digital Load Distribution Control", Proceedings of the IEEE International Symposium on Industrial Electronics, 1996. ISIE '96., Jun. 17, 1996, pp. 808-813, vol. 2, IEEE, Warsaw, Poland.

* cited by examiner

CURRENT SHARE CONFIGURATION IN A POWER CONVERTER SYSTEM

TECHNICAL FIELD

The present invention generally relates to the field of power converter systems having parallel-coupled voltage converting modules, and more specifically to methods of configuring and controlling the sharing of the power system's load current between the voltage converting modules.

BACKGROUND

In many power applications parallel coupling of voltage converting modules (also widely referred to as voltage converters, power supplies or power modules), such as point-of-load (POL) converters, isolated DC/DC converters, bus converters or AC/DC power supplies, caters for the increasing need for greater total power. For example, a typical DC/DC system has an intermediate voltage level of 48 VDC, which is converted down to a typical level of 9-12 VDC. Since this 9-12 V DC-level often requires DC/DC converters that can handle high output current it is often desirable to couple two or more converters in parallel to provide a power converter system in which the load current is shared among the converters. In addition, this redundant topology is particularly suited to applications where a reliable power source is required, for example in high-end servers and tele-communications equipment.

In order to optimise the reliability of the power system it is desirable to evenly distribute the load current among the parallel-coupled power converters, so that the power stress and efficiency are similar for the converters. This has often been achieved in the past with some kind of circuitry that is external to the power supplies, for example o-ring diodes and droop resistors in a passive current share set-up. However, in applications where the conversion losses associated with this passive set-up cannot be tolerated an active current share arrangement can be used. For example, the voltage converting modules may be configured to exchange information concerning their current output levels with other modules and self-regulate their output power on the basis of the received information.

An example of such an active current share scheme is described in US patent application US 2008/0309300 A1. More specifically, a digital current share bus interface is described in which current sense data is conveyed digitally over a current share bus (or simply "share bus"), using a single-wire communication protocol. A power module, being one of several having their outputs connected in parallel, is arranged to provide a digital output signal representative of its output current to an associated share bus interface, and to adjust its output current in response to a signal received from the interface. The power modules are coupled to the current share bus via their respective share bus interfaces.

Each interface includes a digital controller which comprises a data formatting module and a comparator module. The data formatting module receives the output signal representative of the output current of the associated power module and generates a digital word which varies with the output current; the bits of the digital word are coupled to the current share bus. The data formatting module is arranged such that a clock for the bus is modulated onto the data conveyed on the bus. The comparator module receives digital words conveyed via the bus and provides the control signal to the power module so as to adjust its output current to match the current value represented by the digital word on the bus.

In operation, the digital words are conveyed on the current share bus in the form of frames, which are repeated continuously at a frequency of about 10 kHz. Each interface receives current sense information from its respective power module and attempts to write the corresponding word on the current share bus during each frame. Each interface also reads the word representing an output current value on the bus, and compares the read value with the value represented by the word being output, in a bit-by-bit routine, starting with the most significant bit. When the interface detects "contention"—i.e. an interface writes a '0' to the bus, but detects a '1'—it will immediately stop writing to the bus for the duration of the frame. In this way, the data on the bus is a representation of the normalized current of the power module providing the highest output current.

The power module providing the highest output current subsequently decreases its current output while the remaining power modules increase their output current on the basis of the control signals generated by their respective comparator modules. To prevent hunting or oscillation between power modules, an interface conveying a digital word that is within two least significant bits of the interface controlling the bus is required to stop increasing its module's output current.

The current sharing scheme described above thus requires each power module to attempt to put a word representing its measured output current value on the share bus during each frame, and to compare this word bit-wise with the word being read from the bus by the module. This, however, requires a data processing overhead which reduces the efficiency of the power converter. In addition, the implementation of these operations increases the complexity of the power converter's hardware. A simpler and more efficient scheme of configuring and controlling current sharing in a system of parallel-coupled power converters is therefore highly desirable.

SUMMARY OF THE INVENTION

The present inventors have overcome the aforementioned shortcomings of the prior art by providing a scheme of current sharing in a power converter system in which a master-slave relationship between the voltage converting modules is established, wherein one voltage converting module is dedicated to functioning as a master and another voltage converting module is dedicated to functioning as a slave. Thus, in accordance with an embodiment of the present invention, a voltage converting module designated as the master is not required to receive and process information from other modules but only to transmit its current sharing information thereto. Similarly, the functions of the one or more modules designated as a slave are also simplified, as these are required only to receive and process the current sharing information transmitted by the master module, and not to generate and transmit their own current sharing information.

Moreover, the present inventors have devised a particularly efficient scheme for designating a voltage converting module as the master and each other voltage converting module as a slave, so that no additional hardware of significant additional processing is required to establish a master-slave configuration. In particular, the present inventors have found that the establishment of a master-slave configuration can be implemented particularly efficiently by using PMBus signalling to establish a master-slave (or "primary-secondary") relationship between the voltage converting modules, as will become clear from the following.

The scheme of controlling current sharing in accordance with an embodiment employs voltage converting modules which are capable of communicating with a current share controller using the Power Management Bus (PMBus) protocol, in a manner hereinafter described. PMBus is an open-standard digital power management protocol with a fully defined command language (see "PMBus Power System Management Protocol Specification", System Management Interface Forum, Inc. 2005). For example, there are commands for controlling, configuring and monitoring a module's operating parameters, such as its output voltage, warning and fault thresholds for input or output voltages and currents, temperature etc. However, although PMBus and proprietary communication protocols have been widely used in power system communications in recent years, and have been implemented in power systems alongside current-sharing schemes of the kind described above, the potential of PMBus signalling to provide significant efficiency gains in such current sharing schemes has heretofore gone unrecognised.

Accordingly, not only does an embodiment of the present invention reduce the processing operations performed by voltage converting modules to exchange current sharing information by providing a master-slave relationship between the voltage converting modules, but the embodiment also minimises the hardware and processing requirements needed to set up the master-slave relationship.

According to a first aspect of the present invention, there is provided a power converter system comprising a first voltage converting module for converting an input voltage to an output voltage, and a second voltage converting module for converting the input voltage to an output voltage, the second voltage converting module being connected in parallel with the first voltage converting module. The power converter system also includes at least one signalling line between the first voltage converting module and the second voltage converting module. The system also has a current share controller operatively connected to communicate with the first and second voltage converting modules using the Power Management Bus protocol to establish a master-slave relationship between the first and second voltage converting modules, comprising a master voltage converting module and a slave voltage converting module. The first and second voltage converting modules are arranged to operate in a current share configuration so as to share a load current of the power converter system. In this current sharing configuration the master voltage converting module is arranged to determine its output current and send a signal indicative of its output current to the slave voltage converting module via the at least one signalling line. The slave voltage converting module is arranged to adjust its output current in dependence upon the signal from the master voltage converting module.

According to a second aspect of the present invention, there is provided a method for implementation in a power converter system, which comprises a first voltage converting module for converting an input voltage to an output voltage, and a second voltage converting module for converting the input voltage to an output voltage, the second voltage converting module being connected in parallel with the first voltage converting module. The power converter system further comprises a current share controller operatively connected to communicate with the first and second voltage converting modules using the Power Management Bus protocol, and at least one signalling line between the first voltage converting module and the second voltage converting module. The first and second voltage converting modules are operated in a current share configuration so as to share a load current of the power converter system. In accordance with this method, the current share controller communicates with at least one of the first and second voltage converting modules using the Power Management Bus protocol to establish a master-slave relationship between the first and second voltage converting modules, comprising a master voltage converting module and a slave voltage converting module. The method also includes the master voltage converting module determining a current output thereby, and sending a signal indicative of its output current to the slave voltage converting module via the at least one signalling line. The slave voltage converting module adjusts its output current in dependence upon the signal from the master voltage converting module.

According to a third aspect of the present invention there is provided a current share controller for controlling first and second voltage converting modules in a power converter system. The current share controller comprises a communication module operable to communicate with the first and second voltage converting modules using the Power Management Bus protocol. The current share controller also has a master-slave configuring module operable to establish a master-slave relationship between the first and second voltage converting modules, comprising a master voltage converting module and a slave voltage converting module, by transmitting a signal to at least one of the voltage converting modules using the communication module.

According to a fourth aspect of the present invention, there is provided a method of establishing a master-slave relationship between first and second voltage converting modules in a power converter system so that the voltage converting modules can operate in a current share configuration. The method comprises transmitting a signal from a current share controller to at least one of the voltage converting modules using the Power Management Bus protocol.

The present invention also provides a computer program product comprising a computer-readable storage medium or a signal carrying computer program instructions to program a programmable current share controller for use in a power converter system having first and second voltage converting modules. The computer program instructions comprise instructions which, when executed by the current share controller, cause the current share controller to establish a master-slave relationship between the first and second voltage converting modules, comprising a master voltage converting module and a slave voltage converting module. The master-slave relationship is established by transmitting a signal to at least one of the voltage converting modules using the Power Management Bus protocol.

BRIEF DESCRIPTION OF THE DRAWINGS

Embodiments of the invention will now be explained by way of example only, in detail, with reference to the accompanying figures, in which.

DESCRIPTION OF PREFERRED EMBODIMENTS

Figure 1:
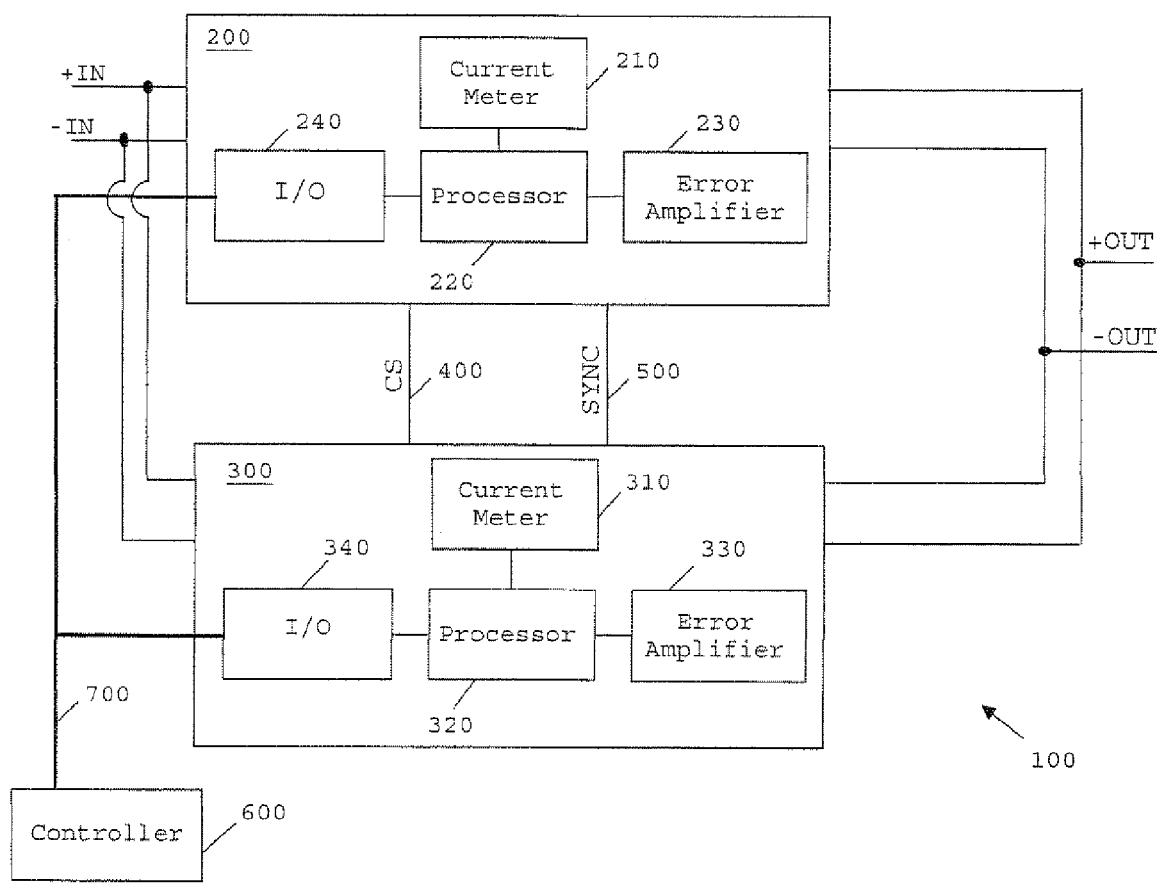
FIG. 1 shows a power converter system according to an embodiment of the present invention.

FIG. 1 is a schematic of a power converter system 100 according to an embodiment of the present invention. The system 100 includes a first voltage converting module in the form of a DC/DC converter 200, and a second voltage converting module 300 which is also a DC/DC converter. In the present embodiment the voltage converting modules 200 and 300 are switched mode power supplies (SMPS) which are preferably set to operate at substantially equal switching frequencies. Voltage converting modules 200 and 300 are connected together in parallel as shown in FIG. 1, with their corresponding input voltage terminals being connected to power input lines +IN and −IN. The voltage converting modules 200 and 300 are thus parallel-coupled to provide a current to a common load (not shown). Most preferably, the modules are Ericsson BMR 453 Series DC/DC converters. Where such converters are used to implement a power converter system according to the invention, Pins 1 and 4 of each converter should be connected to the +IN and −IN power lines, respectively. The output terminals of the modules are connected to power output lines +OUT and −OUT, as also shown in FIG. 1. In the case of BMR 453 Series converters, Pins 5 and 16 should connect to the −OUT and +OUT power lines, respectively.

Although the power converter system 100 of the present embodiment has two voltage converting modules which are both switched mode power supplies, the power system of an alternative embodiment may have more than two modules coupled in parallel, which may be any combination of AC/DC and DC/DC converters that are fed by any suitable arrangement of input power lines.

Each of voltage converting modules 200 and 300 includes a current determining unit for determining the output current of the converter which, in the example of FIG. 1, is a current meter (210, 310). The current meter may measure the current in an inductor of the module's output filter simply by measuring the voltage drop across a resistive current shunt connected in series with the inductor. However, this arrangement reduces the power efficiency of the converter. It is therefore preferable for the current meter to employ a lossless method which exploits the inevitable parasitic resistance in the inductor, such as that described in "A Simple Current-Sense Technique Eliminating a Sense Resistor" (Linfinity Application Note AN-7, Rev. 1.1, 07/1998). The current determining unit of the voltage converting modules may be implemented in any suitable way by those skilled in the art, such that a further description thereof is unnecessary here.

Figure 2:
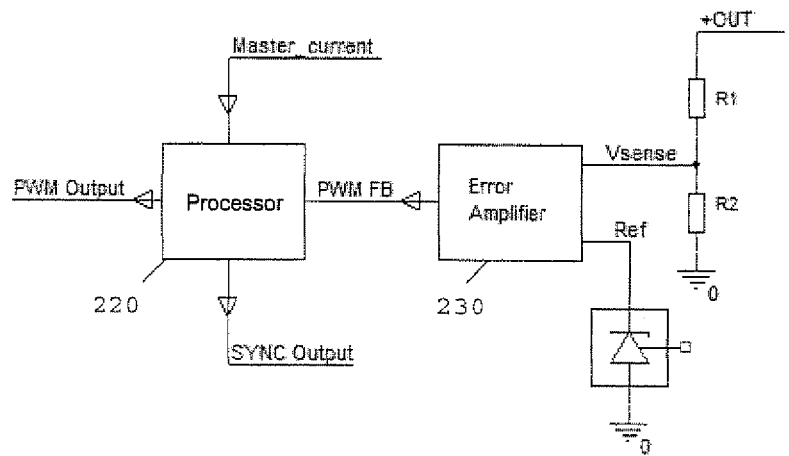
FIG. 2 shows details of DC/DC converter 200 of FIG. 1.
Figure 3:
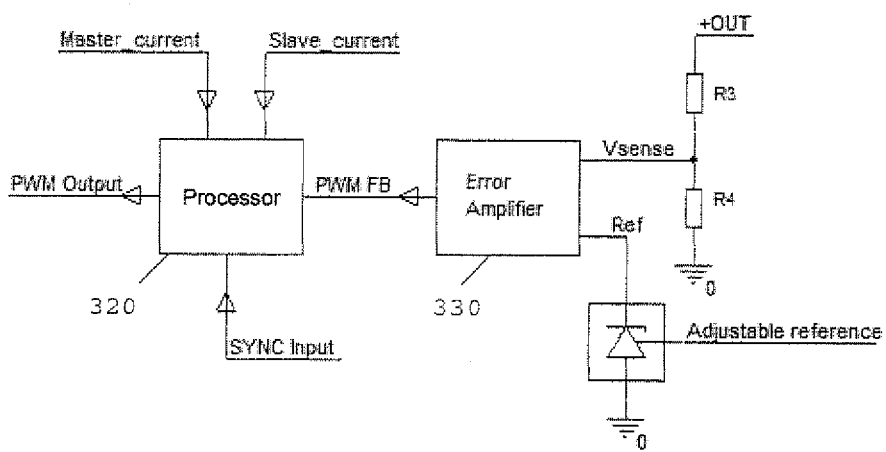
FIG. 3 shows details of DC/DC converter 300 of FIG. 1.

FIG. 2 shows features of the control structure of voltage converting module 200 that are helpful for understanding the invention. Similar features of voltage converting module 300 are shown in FIG. 3. Voltage converting modules 200 and 300 of the present embodiment are each provided with a signal processor (220, 320)—typically a digital integrated circuit (IC)—and an error amplifier (230, 330) having one of its input terminals connected to a reference (Ref) and the other terminal to the output ($V_{sense}$) of a potential divider comprising resistors R1 and R2 in the example of FIG. 2, and resistors R3 and R4 in the example of FIG. 3. In both cases, the error amplifier is configured to measure the difference voltage at its input to generate a difference signal, digitize the difference signal using an analog-to-digital (ADC) converter, and generate a pulse width modulated (PWM) feedback signal for transmission to the processor (220, 320). Processors 220 and 320 are arranged to generate a PWM signal for driving the voltage converting modules' switching transistors, where the duty cycle of the signals is set, on the basis of the PWM feedback signal received from the error amplifier, so as to minimise the voltage difference at the error amplifier input. Processors 220 and 320 are also arranged to generate a PWM output signal whose duty cycle is set on the basis of the output current value measured by the current meter.

In the present embodiment, the output impedance of one voltage converting module is in total about 2 mΩ, meaning that a deviation in its output voltage of 10 mV would represent a 5 A deviation in the output current. To compensate for output current deviations, voltage converting module 300 of the present embodiment is provided with an adjustable reference which can be adjusted by the processor 320. The error amplifier in voltage converting module 200 may also be provided with such an adjustable reference. By adjusting the reference voltage to the error amplifier 340 in small steps (of the order of mV) the output current of voltage converting module 300, hence the current share ratio, can be controlled very accurately by the processor 320.

The output voltage will change according to the minimum step size of the reference voltage and the ratio of the voltage divider comprising resistors R3 and R4. The reference voltage change will depend on how big the deviation in output current is. In the case where voltage converting modules 200 and 300 operate in a master-slave current sharing configuration where module 200 is the master and module 300 the slave, the output voltage will change in my according to Equation 2 below.

$$\text{Current\_error} = (\text{Master\_current} - \text{Slave\_current}) \quad \text{Eqn. 1}$$

$$\text{Vout\_change} = \frac{8}{3} |\text{Current\_error}| \quad \text{Eqn. 2}$$

$$\text{Gain} = \frac{\text{Vout}}{\text{ref}} \quad \text{Eqn. 3}$$

In Eqn. 3, Vout denotes the module's output voltage. For better performance, it is preferable that when 2 A<|Master_current−Slave_current|<5.25 A, Vout_change (mV)=8/3 (Master_current (A)−Slave_current (A)), while when |Master_current−Slave_current|≥5.25 A, Vout_change (mV)=16/3 (Master_current (A)−Slave_current (A)).

Increased dynamic requirements, such as monotonic start-up, recovery after short-circuit, load transient performance and improved current share, have led to the re-partitioning of the control structure in modern insulated power converters. Previously, the normal way of structuring the design was to place the control circuit on the primary side and only transmit an error signal from a voltage control system on the secondary side. However, to improved efficiency, it is preferable to place the control-circuit on the secondary side, where the output voltage and output current can be monitored more accurately. The presence of digital control and a digital interface placed on the secondary side in the present embodiment makes it even more favorable to use this secondary side control.

Referring again to FIG. 1, voltage converting module 200 of the present embodiment is configured to send a current share signal (CS) indicative of its output current to module 300 via a signalling line 400 between the voltage converting module 200 and voltage converting module 300. In the present embodiment module 200 is also capable of receiving via the signalling line 400, and processing by the processor 220, a current share signal which is indicative of the output current of module 300. Voltage converting module 300 is similarly configured to send a current share signal which is indicative of its output current to module 200 via the signalling line 400, and also to receive via the signalling line, and to process using processor 320, a signal which is indicative of the output current of module 200. Thus each of modules 200 and 300 can be configured to function either as a master or a slave, in accordance with the method described below. Where the modules are Ericsson EMR 453 Series converters, the CS signalling line 400 should be connected to Pin 12 of each module.

The indication of the output current may be provided in any suitable or desirable way. For example, in the present embodiment a voltage converting module is configured to apply a voltage to the signalling line whose magnitude provides a measure of the module's output current. This is achieved by the processor generating a PWM output signal on the basis of its output current level as measured by the current meter. The width of a pulse in the PWM signal or the signal's duty cycle is indicative of the output current level. The PWM signal is then filtered by an R-C net to give a DC signal whose size is indicative of the module's output current.

Where, as in the present example, the voltage converting modules are SMPS units, it is preferable for the voltage converter system to also be provided with a second signalling line 500 for communicating a synchronization (SYNC) signal, such as a sequence of voltage pulses, from one voltage converting module to the other. The synchronization signal serves to synchronize the switching of the two switched mode power supplies, including interleaving. The input current ripple in the converters will then be phase shifted by 90°. This will reduce the RMS value of the ripple and the need of dimensioning of external filtering. Where the voltage converting modules are Ericsson BMR 453 Series DC/DC converters, the SYNC signalling line 500 should be connected to Pin 15 of each module's interface.

Voltage converting module 200 of the present embodiment also has an input/output (I/O) interface 240 by which it can be digitally controlled and managed by a power system controller 600, which will be described in detail below. Control signals and information are exchanged between the system controller 600 and module 200 via a communications bus 700, using the PMBus protocol. Voltage converting module 300 also has an input/output (I/O) interface 340 by which it can be digitally controlled and managed by controller 600 via bus 700. Each of the voltage converting modules 200 and 300 is preferably configured to be capable of transmitting a signal indicative of its output current to the system controller 600 via its I/O interface and the communications bus 700, so that either module can be configured to function as the master of a slave module. The communications bus 700 can be any communications bus having two or more communication lines or channels for supporting PMBus communications.

The system controller 600 will now be described with reference to FIG. 4. The system controller 600 comprises an input/output (I/O) or transceiver section 610 for transmitting and receiving information to/from the voltage converting modules. The transceiver section 610 is connected to the I/O interfaces 240, 340 of the modules via the communications bus 700, which enables an exchange of information and control signals therebetween. In particular, the transceiver section 610 of the present embodiment is configured to receive information concerning the modules' operating conditions, including their output currents.

The transceiver section 610 is preferably further configured to receive other parameters from the voltage converting modules such as information concerning their duty cycles and temperatures, system status information for fault monitoring and diagnostics etc. These parameters may be used by the system controller for any useful or desirable purpose, for example to implement safety features such as protective cut-offs which ensure that critical parameters such as the component temperatures do not exceed pre-determined thresholds. In the present embodiment the system controller 600 serves to configure, monitor and control operational parameters and settings of the voltage converting modules. The controller 600 may forward some of the received information to a higher-level system which may be located off the board on which the power converter system 100 is formed.

Figure 4:
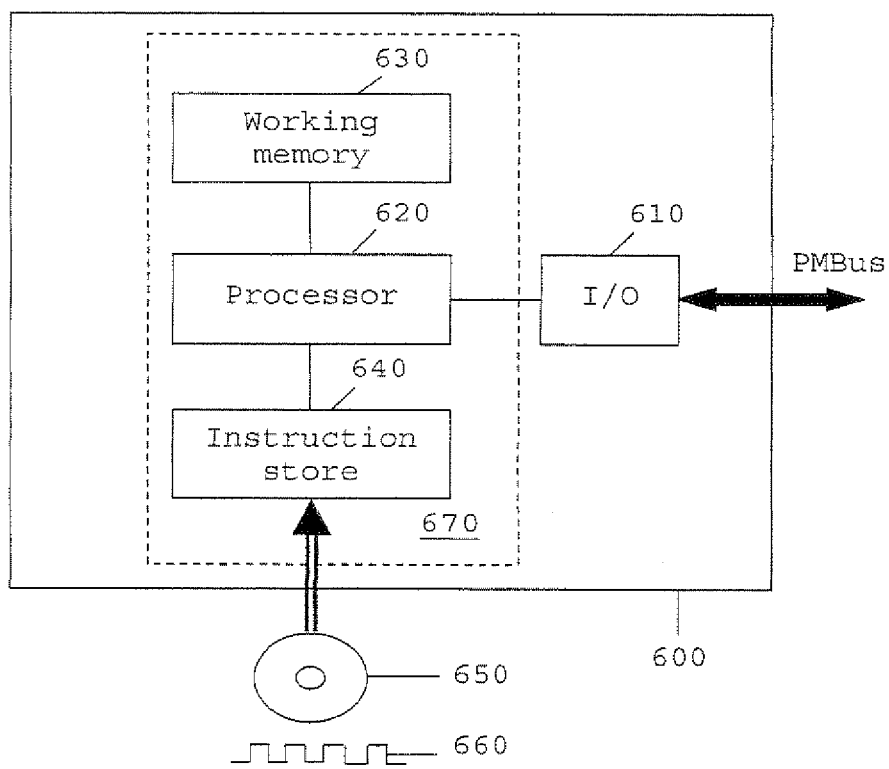
FIG. 4 shows details of the system controller shown in FIG. 1.

As shown in FIG. 4, the system controller 600 further comprises a processor 620, a working memory 630 and an instruction store 640 storing computer-readable instructions which, when executed by the processor 620 cause the processor to perform the processing operations hereinafter described to generate control signals for configuring the voltage converting modules for current sharing, and preferably also to improve the efficiency of the system at low current loads. The instruction store 640 may comprise a ROM which is pre-loaded with the computer-readable instructions. Alternatively, the instruction store 640 may comprise a RAM or similar type of memory, and the computer readable instructions can be input thereto from a computer program product, such as a computer-readable storage medium 650 such as a DVD-ROM, CD-ROM, etc. or a computer-readable signal 660 carrying the computer-readable instructions.

Figure 5:
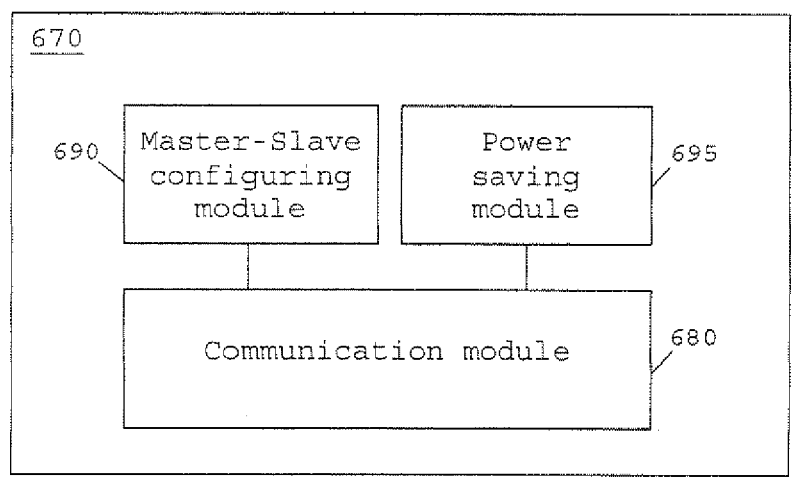
FIG. 5 shows the current share controller of the embodiment.

In the present embodiment, the combination 670 shown in FIG. 4 comprising the processor 620, working memory 630 and instruction store 640, when programmed by the computer-readable instructions, is arranged to function as a communication module, a master-slave configuring module, and preferably also as a power saving module of a current share controller. These modules are described in detail below. Although the functions of these modules are provided in the present embodiment by the programmable processing apparatus shown in FIG. 4, it should be noted that one or more of the modules may alternatively be implemented in non-programmable hardware (e.g. an ASIC) that is dedicated to serving the function of the one or more modules. In FIG. 5, the current share controller 670 of the present embodiment is illustrated in terms of its functional components, namely the communication module 680, master-slave configuring module 690 and the power saving module 695.

The operation of the current share controller in the voltage converter system 100 of the present embodiment will now be described with reference to the flow diagram shown in FIGS. 6 and 7. The process steps performed by voltage converting modules 200 and 300 in the present embodiment are shown in FIG. 8.

Figure 6:
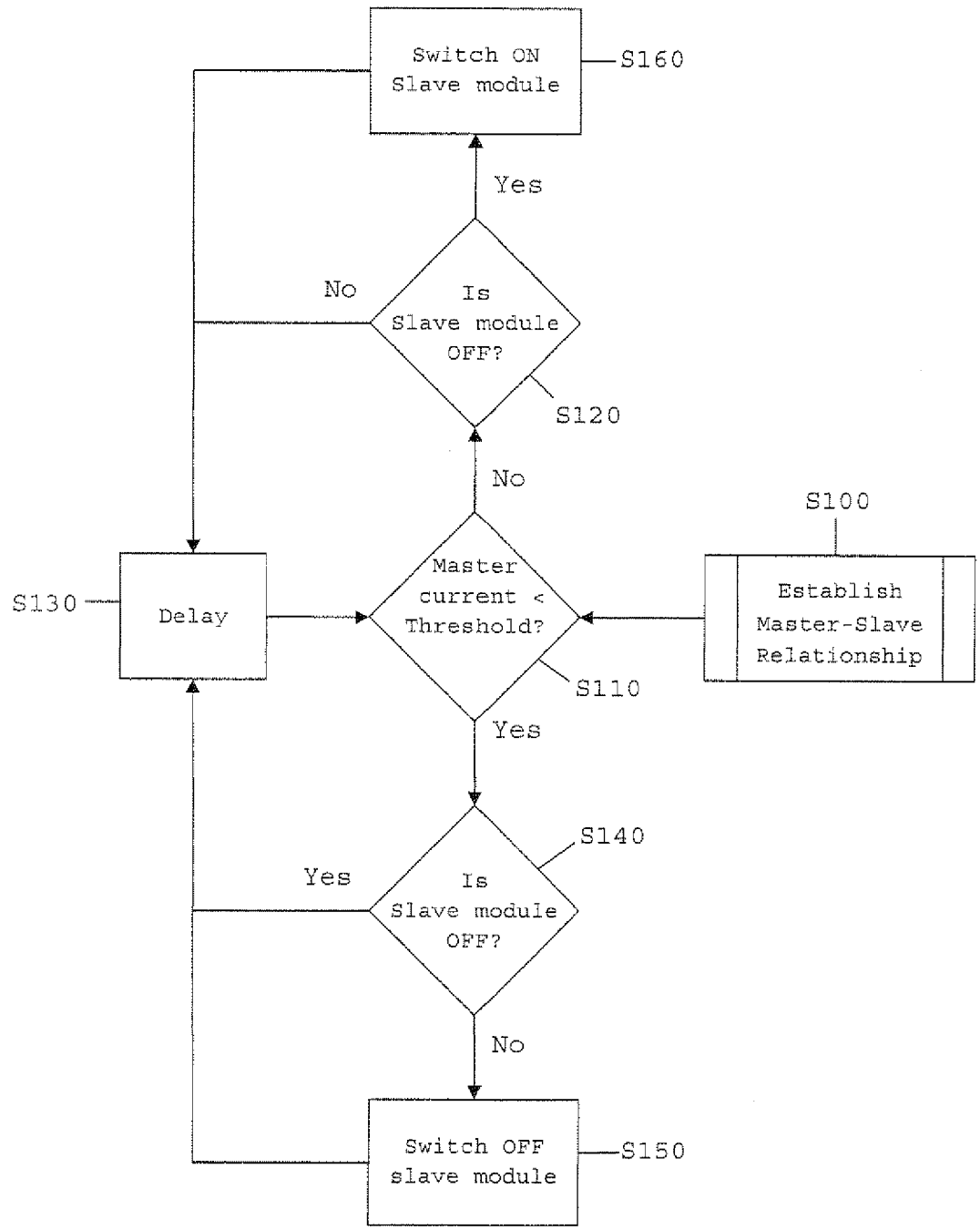
FIG. 6 is a flow diagram illustrating process steps performed by the current share controller shown in FIG. 5.

Referring firstly to FIG. 6, in step S100, the master-slave configuring module 690 of the current share controller establishes a master-slave relationship between voltage converting modules 200 and 300. The process steps performed by the master-slave configuring module 690 are shown in FIG. 7.

Figure 7:
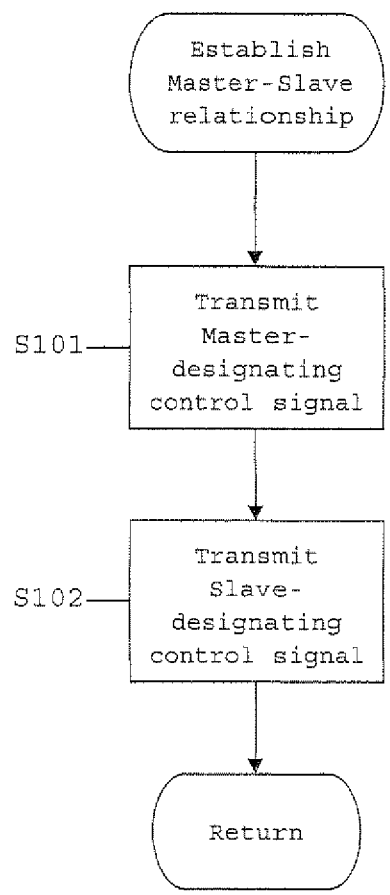
FIG. 7 is a flow diagram illustrating process steps performed by the master-slave configuring module at step S100 in FIG. 6.
Figure 8:
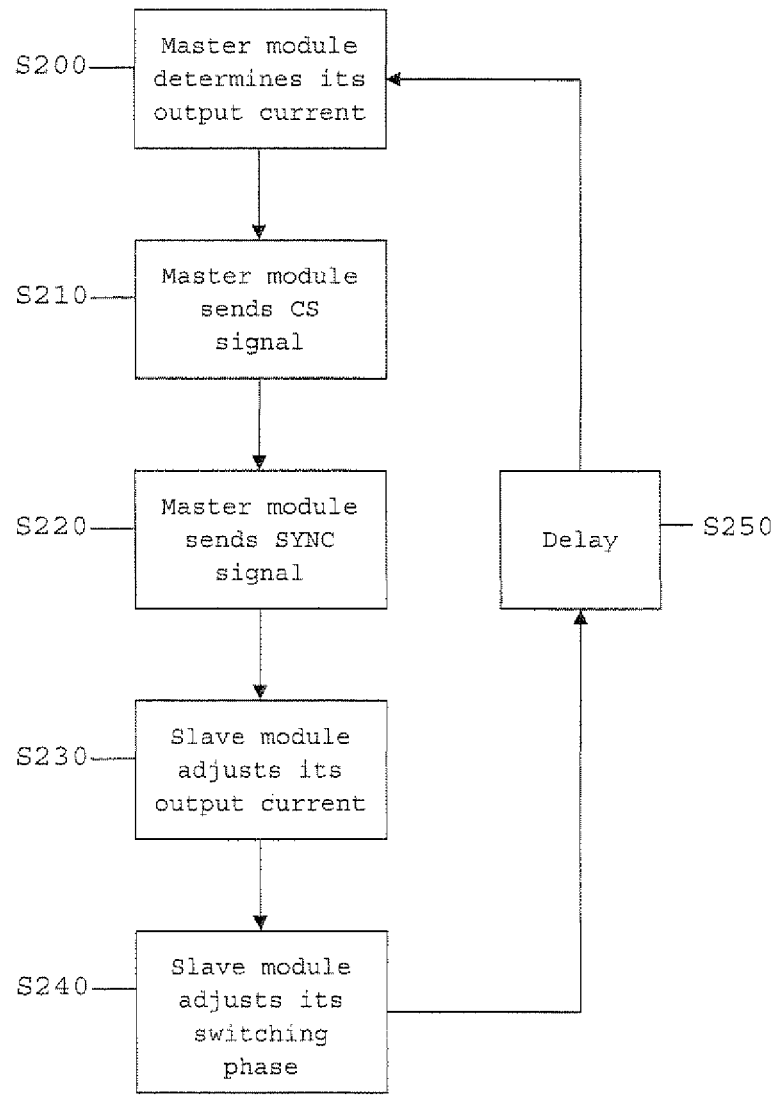
FIG. 8 is a flow diagram illustrating process steps performed by the voltage converters of FIG. 1 to adjust their current share ratio.

In step S101 of FIG. 7, the master-slave configuring module 690 generates a master-designating control signal instructing the module to which it is addressed to function as the master in a master-slave current sharing arrangement. In the present embodiment, voltage converting module 200 is designated the master voltage converter. The signal is transmitted to module 200 by the communication module 680 of the current share controller 670, using the PMBus protocol.

In step S102, the master-slave configuring module 690 generates a slave-designating control signal instructing the module to which is addressed, namely module 300, to function as a slave in a master-slave current sharing arrangement. The signal is transmitted to module 300 also by the communication module 680 of the current share controller 670, using the PMBus protocol.

However, it is noted that in an alternative embodiment, where the modules are pre-set to function as slave modules by default, the master-slave configuring module 690 need only generate and send a master-designating control signal to one of the voltage converting modules, which is to be designated as the master. Thus step S102 may be omitted in this alternative embodiment.

Where the voltage converting modules are Ericsson BMR 463 Series converters, the module can be configured in accordance with Table 1 overleaf. In this particular example both of the modules are configured to operate at a switching frequency of 140 kHz (although a frequency of 125 kHz or 150 kHz can also be used), and that the master module 200 is configured to start up before the slave module 300. Slave module 300 will then start up against a biased output, and its duty cycle will preferably be calculated to correspond to the bias voltage. This is done to avoid sinking current from the biased output of the master module 200. This pre-bias start-up method is described in international patent application WO2007/061369 A1, the entire contents of which are incorporated herein by cross-reference.

mines whether the slave module is switched OFF. If the slave module has not been switched OFF, the process continues to step S130, where the current share controller 670 executes a time delay during which the master and slave voltage converting modules operate in the current-sharing arrangement in accordance with one or more iterations of the process shown in FIG. 8, which will be described in detail below.

Steps S110 to S130 are then repeated unless and until it is established in step S110 that the master module's output current has fallen below the threshold value as a result of the power converter system's load current decreasing to a sufficiently low level. In this case, the process proceeds to step S140, where the power saving module determines, using the communication module 680, whether the slave voltage converting module 300 has been switched OFF. If it has not, the slave voltage converting module is switched OFF in step S150 by control signals which are generated by the power saving module and transmitted by the communication module, thereby reducing the system power loss that results from the running of the second (slave) voltage converting module, which is not required in a low-load situation. Thus, where the power converter system's load current falls to a sufficiently low level during operation, the power saving module can switch OFF the slave voltage converting module (or, more generally, one or more slave modules in the power system). This will save energy since the power loss will be lower if only one voltage converting module is running instead of two.

TABLE 1

| Code | Command | Default setting Current Share mode (Master) | Default setting Current Share mode (Slave) | Comment |
|---|---|---|---|---|
| 0xF9 | MULTI_PIN_CONFIG | 0xC0 | 0x60 | Configure the multi pin (Pin 12) for master and slave. |
| 0x60 | TON_DELAY | 0x0028 (40 ms) | 0x0037 (55 ms) | The slave should have a 15 ms start-up delay compared to the master. |
| 0x35 | VIN_ON | 0x002a (42 V) | 0x002b (43 V) | 1 V higher turn-on level for the slave. The slave regulation range is ±1 V, from the initial start-up point. |
| 0x33 | FREQUENCY_SWITCH | 0x008C (140 kHz) | 0x008C (140 kHz) | The same frequency is set in both master and slave, to be able to sync master and slave. |

Referring again to FIG. 6, once the master-slave relationship has been established between the voltage converting modules by the master-slave configuring module, in step S110 the power saving module 695 of the current share controller 670 communicates with the voltage converting module 200 using the communication module 680 to obtain a value indicative of the master module's output current. The communication module 680 communicates with the master and slave voltage converting modules using the PMBus protocol. The power saving module then determines whether the output current is less than a threshold value. If it is not, the process proceeds to step S120, where the power saving module deter- The process then proceeds to step S130, and thereafter to step S110. If the master voltage converting module's output current is still found to be below the threshold value, the process proceeds to step S140 and thereafter to step S130. Steps S110, S140 and S130 are therefore repeated unless and until it is determined in step S110 that the master module's output current is not less than the threshold value, whereupon the process proceeds to step S120. Since it will then be determined in step S120 that the slave module 300 has been switched OFF, the process proceeds to step S160, where the slave module is switched ON by the power saving module, in accordance with control signals send over communications bus 700 using the communication module. Voltage converting module 300 then starts up as described above and functions as a slave in accordance with its default settings. Steps 110 to 5130 are thereafter repeated unless and until the master's output current is determined by the power saving module to have fallen below the threshold.

The processing steps performed by the master and slave voltage converting modules in a current sharing arrangement will now be described with reference to FIG. 8.

In step S200, the master voltage converting module 200 determines its output current by the current meter 210 measuring one or more sample values of the output current, and the processor 220 calculating a mean value where two or more samples have been taken.

In step S210, the master voltage converting module generates a PWM signal on the basis of the determined output current value, where a pulse width of a pulse in the signal is indicative of the master's output current level. In the present embodiment, the PWM signal is then filtered by an R-C filter net to give a DC current share (CS) signal whose magnitude provides a measure of the master module's output current. The CS signal is then transmitted to the slave voltage converting module 300 via signalling line 400.

In step S220, the master voltage converting module 200 preferably generates and sends via the signalling line 500 a synchronization (SYNC) signal to the slave voltage converting module 300. The SYNC signal preferably takes the form of a series of pulses whose frequency corresponds to the switching frequency of the master module or a fraction thereof.

In step S230, slave voltage converting module 300 adjusts its output current level on the basis of the CS signal received from master module 200. In particular, the processor 320 calculates the difference between the master's current level, as indicated by the size of the received CS signal, and the level of the slave's output current as determined by the slave's current meter 310. The slave module then adjusts the adjustable reference to its error amplifier 330 in dependence on the calculated difference, and thereby its switching duty cycle and output current.

In step S240, the processor 320 adjusts the phase of its switching cycle relative to the phase of the received SYNC signal, in order to reduce the input and output current ripple of the converter system 100.

In step S250, the master voltage converting module executes a time delay before again determining its output current in step S200. Steps S200 to S250 are thus repeated such that the master module 200 monitors its output current and sends signals indicative of its output current to slave module 300, which in turn adjusts its output current on the basis of the received signals. The slave module thus adjusts its output current to be substantially equal to the master module's output current. However, the power saving module 695 can, upon detecting a low-load situation, interrupt the process of FIG. 8 by turning the slave voltage converting module OFF.

[Modifications and Variations]

Many modifications and variations can be made to the embodiment described above. Examples of such modifications and variations, which may be made individually or in any combination, will now be described.

For example, it will be appreciated that some of the steps in FIG. 8 can be performed simultaneously and that the order of some of the steps can be interchanged. For example, the master voltage converting module 200 may send the synchronization (SYNC) signal before or at the same time as the current share (CS) signal to the slave voltage converting module 300, i.e. step S220 may alternatively be performed before or at the same time as step S210. Similarly, step S240 may alternatively be performed before or at the same time as step S230 by the slave module 300. Furthermore, in other embodiments, the frequency at which steps S210 and S230 are performed is different to the frequency at which steps S220 and S240 are performed.

The current share controller 670 may be provided as a stand-alone hardware component, or may be integrated as part of an on-board system controller 600, as shown, or integrated into one of the voltage converting modules. Alternatively, the current share controller may be provided as part of an off-board controller.

Furthermore, although in the above embodiment the current share signal transmitted from the master voltage converting module 200 to the slave voltage converting module 300 takes the form of a DC signal whose voltage level is indicative of the master module's output current, other signals can be used. For example, in an another embodiment, which need not have voltage converting modules in the form of switched mode power supplies, the master module 200 dispenses with the aforementioned R-C filter net and is arranged to transmit a PWM signal generated on the basis of its output current to the slave module. In this case, the slave module is configured to measure the pulse width or duty cycle of the received PWM signal and to adjust its output current on the basis of the measured value. Signals of this form have the advantage of making the CS communications less susceptible to noise and interference on the CS signalling line 400, since these have little effect on the PWM pulse width.

Where such a PWM current share signal is used, the slave voltage converting module is preferably configured to generate a timing signal by detecting leading and/or trailing edge pulses of the PWM signal, and to adjust the phase of its switching cycle relative to the timing signal so as to reduce the input and output ripple current of the voltage converter system 100. In this case, both the CS and SYNC signals are conveyed by means of the PWM signal along only one signalling line. The frequency of the PWM signal is preferably the same as the switching frequency of the master voltage converting module.

The invention claimed is:

1. A power converter system, comprising:
   a first voltage converting module for converting an input voltage to a first output voltage;
   a second voltage converting module for converting the input voltage to a second output voltage, the second voltage converting module being connected in parallel with the first voltage converting module;
   at least one signaling line between the first voltage converting module and the second voltage converting module; and
   a current share controller operatively connected to communicate with the first and second voltage converting modules using a Power Management Bus protocol to establish a master-slave relationship between the first and second voltage converting modules such that one of the first and second voltage converting modules comprises a master voltage converting module and the other of the first and second voltage converting modules comprises a slave voltage converting module;
   wherein the first and second voltage converting modules are configured to operate in a current share configuration so as to share a load current of the power converter system, wherein the master voltage converting module is configured to determine its output current and send a current share signal indicative of its output current to the slave voltage converting module via the at least one signaling line, and the slave voltage converting module is configured to adjust its output current in dependence upon the current share signal from the master voltage converting module;

wherein the master voltage converting module is configured to send a pulse width modulated signal to the slave voltage converting module via the at least one signaling line, a pulse width of the pulse width modulated signal being indicative of the output current of the master voltage converting module; and wherein the slave voltage converting module is configured to measure the pulse width of the pulse width modulated signal and adjust its output current in dependence upon the measured pulse width.

2. The power converter system according to claim 1, wherein the current share controller is configured use the Power Management Bus protocol to monitor the output current of the master voltage converting module and send to the slave voltage converting module an on/off signal instructing the slave voltage converting module to switch OFF responsive to the current output by the master voltage converting module falling below a threshold during operation of the power converter system.

3. The power converter system according to claim 1, wherein:

each of the first voltage converting module and the second voltage converting module comprises a switched mode power supply, the first and second voltage converting modules being configured to operate, in use, at respective switching frequencies which are substantially equal; and the slave voltage converting module is configured to generate a timing signal by detecting edges of the pulse width modulated signal, and to adjust a phase of a switching cycle of the slave voltage converting module relative to the timing signal so as to reduce a current ripple of the power converter system.

4. A method of operating first and second voltage converting modules connected in parallel in a power converter system in a current share configuration so as to share a load current of the power converter system, the method comprising:

communicating, via a current share controller operatively connected to the first and second voltage converting modules, with at least one of the first and second voltage converting modules using a Power Management Bus protocol to establish a master-slave relationship between the first and second voltage converting modules such that one of the first and second voltage converting modules comprises a master voltage converting module and the other of the first and second voltage converting modules comprises a slave voltage converting module;

determining, at the master voltage converting module, a current output thereby;

sending, from the master voltage converting module, a current share signal indicative of the current output by the master voltage converting module to the slave voltage converting module via at least one signaling line operatively connected between the first voltage converting module and the second voltage converting module; and adjusting, at the slave voltage converting module, a current output of the slave voltage converting module in dependence upon the current share signal from the master voltage converting module;

wherein sending the current share signal comprises sending a pulse width modulated signal from the master voltage converting module to the slave voltage converting module via the at least one signaling line, in which a pulse width of a pulse of the pulse width modulated signal is indicative of the current output by the master voltage converting module; and wherein adjusting the current output by the slave voltage converting module comprises measuring the pulse width of the pulse of the pulse width modulated signal and adjusting the current output by the slave voltage converting module in dependence upon the measured pulse width.

5. The method according to claim 4, further comprising monitoring the output current of the master voltage converting module at the current share controller according to the Power Management Bus protocol, and sending an on/off signal from the current share controller to the slave voltage converting module according to the Power Management Bus protocol to instruct the slave voltage converting module to switch OFF when the current output by the master voltage converting module falls below a threshold.

6. The method according to claim 4, wherein each of the first voltage converting module and the second voltage converting module comprises a switched mode power supply, the first and second voltage converting modules being arranged to operate at respective switching frequencies which are substantially equal, and wherein the method further comprises:

generating, in the slave voltage converting module, a timing signal by detecting edges of the pulse width modulated signal; and adjusting a phase of a switching cycle of the slave voltage converting module relative to the timing signal so as to reduce a current ripple of the power converter system.

7. A current share controller for controlling first and second voltage converting modules in a power converter system, the current share controller comprising:

a communication module configured to communicate with the first and second voltage converting modules using a Power Management Bus protocol; and a master-slave configuring module configured to establish a master-slave relationship between the first and second voltage converting modules such that one of the first and second voltage converting modules comprises a master voltage converting module and the other of the first and second voltage converting modules comprises a slave voltage converting module by transmitting a current share signal to at least one of the voltage converting modules using the communication module, such that the master voltage converting module sends a pulse width modulated signal to the slave voltage converting module via at least one signaling line between the first and second voltage converting modules, a pulse width of the pulse width modulated signal being indicative of an output current of the master voltage converting module, and such that the slave voltage converting module measures the pulse width of the pulse width modulated signal and adjusts its output current in dependence upon the measured pulse width.

8. The current share controller according to claim 7, further comprising a power saving module configured to use the communication module, when operatively connected to the first and second voltage converting modules, to monitor the output current of the master voltage converting module and to send to the slave voltage converting module an on/off signal instructing the slave voltage converting module to switch OFF when the current output by the master voltage converting module falls below a threshold during operation of the power converter system.

9. A method of establishing a master-slave relationship between first and second voltage converting modules in a power converter system so that the voltage converting modules can operate in a current share configuration, the method comprising transmitting a signal from a current share controller to at least one of the voltage converting modules using a Power Management Bus protocol such that one of the first and second voltage converting modules comprises a master voltage converting module and the other of the first and second voltage converting modules comprises a slave voltage converting module, wherein a current output of the slave voltage converting module is controlled responsive to a current output of the master voltage converting module, wherein a pulse width modulated signal is sent from the master voltage converting module to the slave voltage converting module via at least one signaling line, wherein a pulse width of a pulse of the pulse width modulated signal is indicative of the current output by the master voltage converting module, and wherein the current output by the slave voltage converting module is controlled by measuring the pulse width of the pulse of the pulse width modulated signal and adjusting the current output by the slave voltage converting module in dependence upon the measured pulse width.

10. The method according to claim 9, further comprising monitoring a current output by the master voltage converting module at the current share controller according to the Power Management Bus protocol, and sending an on/off signal from the current share controller to the slave voltage converting module according to the Power Management Bus protocol to instruct the slave voltage converting module to switch OFF when the current output by the master voltage converting module falls below a threshold during operation of the power converter system.

11. A non-transitory computer-readable storage medium storing non-transient computer program instructions to program a programmable current share controller for use in a power converter system having first and second voltage converting modules, the computer program instructions comprising instructions which, when executed by the current share controller, cause the current share controller to establish a master-slave relationship between the first and second voltage converting modules such that one of the first and second voltage converting modules comprises a master voltage converting module and the other of the first and second voltage converting modules comprises a slave voltage converting module by transmitting a signal to at least one of the first and second voltage converting modules using a Power Management Bus protocol wherein a current output of the slave voltage converting module is controlled responsive to a current output of the master voltage converting module, wherein a pulse width modulated signal is sent from the master voltage converting module to the slave voltage converting module via at least one signaling line, wherein a pulse width of a pulse of the pulse width modulated signal is indicative of the current output by the master voltage converting module, and wherein the current output by the slave voltage converting module is controlled by measuring the pulse width of the pulse of the pulse width modulated signal and adjusting the current output by the slave voltage converting module in dependence upon the measured pulse width.

12. The non-transitory computer-readable storage medium according to claim 11, wherein the computer program instructions comprise further instructions which, when executed by the current share controller, cause the current share controller to use the Power Management Bus protocol to monitor the current output by the master voltage converting module, and to send to the slave voltage converting module an on/off signal instructing the slave voltage converting module to switch OFF when the current output by the master voltage converting module falls below a threshold.

* * * * *